(12) United States Patent
Nagamine et al.

(10) Patent No.: US 12,394,104 B2
(45) Date of Patent: Aug. 19, 2025

(54) INFORMATION PROCESSING APPARATUS, NON-TRANSITORY COMPUTER READABLE MEDIUM STORING PROGRAM, AND INFORMATION PROCESSING SYSTEM

(71) Applicant: FUJIFILM Business Innovation Corp., Tokyo (JP)

(72) Inventors: Takeshi Nagamine, Kanagawa (JP); Masahiro Yamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 833 days.

(21) Appl. No.: 17/469,428

(22) Filed: Sep. 8, 2021

(65) Prior Publication Data

US 2022/0343557 A1  Oct. 27, 2022

(30) Foreign Application Priority Data

Apr. 27, 2021 (JP) ................................. 2021-074986

(51) Int. Cl.
| | | |
|---|---|---|
| *G06T 11/00* | (2006.01) | |
| *G06F 3/04883* | (2022.01) | |
| *G06V 10/56* | (2022.01) | |
| *G06V 40/20* | (2022.01) | |

(52) U.S. Cl.
CPC .......... *G06T 11/00* (2013.01); *G06F 3/04883* (2013.01); *G06V 10/56* (2022.01); *G06V 40/28* (2022.01)

(58) Field of Classification Search
CPC ........ G06T 11/00; G06V 10/56; G06V 40/28; G06F 3/04883

USPC ........................................................... 345/633
See application file for complete search history.

(56) References Cited

U.S. PATENT DOCUMENTS

| | | | |
|---|---|---|---|
| 7,365,706 | B2 | 4/2008 | Shimoyama et al. |
| 7,844,921 | B2 | 11/2010 | Ike et al. |
| 10,536,691 | B2 * | 1/2020 | Valdivia .................. H04L 51/52 |
| 10,852,839 | B1 * | 12/2020 | Ravasz .................... G06F 3/017 |
| 10,890,983 | B2 * | 1/2021 | Ravasz .................... G06F 3/017 |
| 2012/0249741 | A1 * | 10/2012 | Maciocci .............. G06T 19/006 348/51 |
| 2017/0228130 | A1 * | 8/2017 | Palmaro ................ G06F 3/0482 |

(Continued)

FOREIGN PATENT DOCUMENTS

| | | |
|---|---|---|
| JP | 2002-268621 A | 9/2002 |
| JP | 2008-52590 A | 3/2008 |

(Continued)

OTHER PUBLICATIONS

"Arcore;" <URL: https://developers.google.com/ar/develop/fundamentals>; [Accessed on Jun. 3, 2019].

(Continued)

*Primary Examiner* — Thomas J Lett
(74) *Attorney, Agent, or Firm* — Oliff PLC

(57) ABSTRACT

An information processing apparatus includes a processor configured to: acquire a target video showing a target of an instruction, and fingertip information indicating a hand motion of a user; overlay the target video with a fingertip object indicated by the fingertip information; and present the fingertip object while changing a representation of the fingertip object based on input information included in the fingertip information or input by the user.

19 Claims, 8 Drawing Sheets

(56) References Cited

U.S. PATENT DOCUMENTS

| | | | |
|---|---|---|---|
| 2020/0278740 A1* | 9/2020 | Gonzalez Franco | ... G06F 3/011 |
| 2020/0311396 A1* | 10/2020 | Pollefeys | ................ G06T 19/20 |
| 2020/0387228 A1* | 12/2020 | Ravasz | ................ G06T 19/006 |

FOREIGN PATENT DOCUMENTS

| | | |
|---|---|---|
| JP | 2015-099574 A | 5/2015 |
| JP | 2020-113094 A | 7/2020 |
| JP | 2021-047499 A | 3/2021 |
| WO | 2019/230155 A1 | 12/2019 |
| WO | 2020/149270 A1 | 7/2020 |

OTHER PUBLICATIONS

Oct. 15, 2024 Office Action issued in Japanese Patent Application No. 2021-074986.

Feb. 18, 2025 Office Action issued in Japanese Patent Application No. 2021-074986.

\* cited by examiner

INFORMATION PROCESSING APPARATUS, NON-TRANSITORY COMPUTER READABLE MEDIUM STORING PROGRAM, AND INFORMATION PROCESSING SYSTEM

CROSS-REFERENCE TO RELATED APPLICATIONS

This application is based on and claims priority under 35 USC 119 from Japanese Patent Application No. 2021-074986 filed Apr. 27, 2021.

BACKGROUND (i) Technical Field

The present disclosure relates to an information processing apparatus, a non-transitory computer readable medium storing a program, and an information processing system.

(ii) Related Art

In a technology disclosed in Arcore. https://developers-.google.com/ar/. Accessed: 2019-06-03., a developer may render virtual contents at a correct angle when the pose of a virtual camera that renders 3D contents is adjusted to the pose of a camera of a device provided by ARCore. The rendered virtual image is laid over an image acquired from the camera of the device, thereby providing an experience in which the virtual contents would exist as a part of the real world.

SUMMARY

Aspects of non-limiting embodiments of the present disclosure relate to the following circumstances. When giving an instruction to a remote user about a specific target on a site, communication may be made by using a video showing the target. It is difficult to orally convey details of the instruction correctly even by using the video. Even in a case of communication using the video overlaid with an instructor's hand motion, the hand motion may mislead the remote user.

Aspects of non-limiting embodiments of the present disclosure therefore relate to an information processing apparatus, a non-transitory computer readable medium storing an information processing program, and an information processing system in which the representation of a fingertip object laid over a video showing a target to indicate a user's instruction may be changed based on information input by a user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to: acquire a target video showing a target of an instruction, and fingertip information indicating a hand motion of a user; overlay the target video with a fingertip object indicated by the fingertip information; and present the fingertip object while changing a representation of the fingertip object based on input information included in the fingertip information or input by the user.

BRIEF DESCRIPTION OF THE DRAWINGS

An exemplary embodiment of the present disclosure will be described in detail based on the following figures, wherein.

DETAILED DESCRIPTION

An exemplary embodiment of a technology disclosed herein is described in detail with reference to the drawings.

Figure 1:
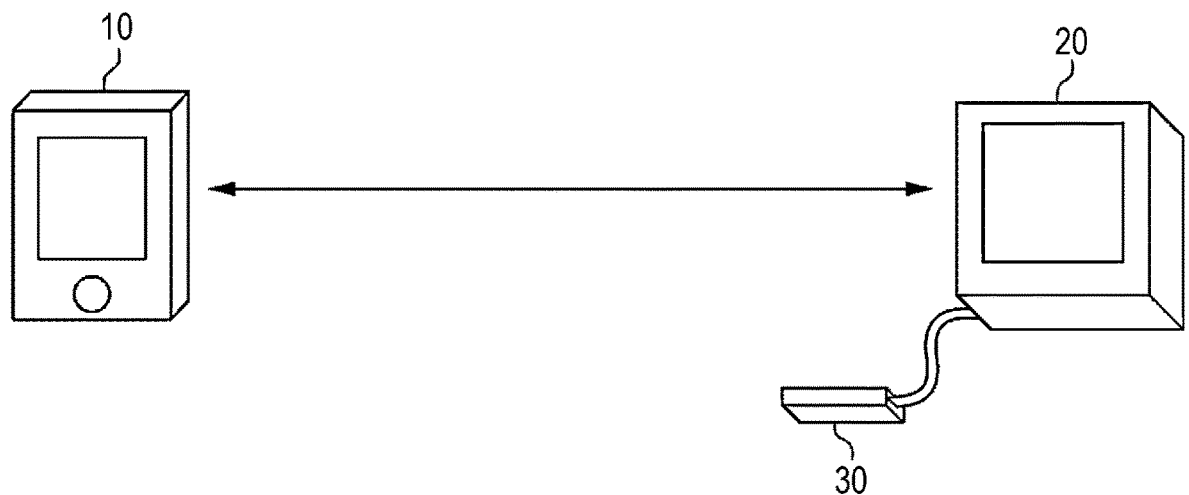
FIG. 1 illustrates the overall configuration of an information processing system including an information processing apparatus.

FIG. 1 illustrates the overall configuration of an information processing system including an information processing apparatus 1 according to this exemplary embodiment.

For example, the information processing apparatus 1 according to this exemplary embodiment is used by an expert to give an instruction to a remote engineer about a specific target. The information processing apparatus 1 displays a target on an expert-side device and an engineer-side device, and overlays a video of the displayed target with an object indicating an expert's hand motion. The information processing apparatus 1 presents the object while distinguishing its representation based on information input by the expert. The object laid over the video of the target to indicate the expert's hand motion is hereinafter referred to as "fingertip object".

The information processing apparatus 1 according to this exemplary embodiment is mounted on each of an engineer-side device 10 and an expert-side device 20. As illustrated in FIG. 1, the engineer-side device 10 and the expert-side device 20 are communicably connected together. Although illustration is omitted, those devices are connected to a network and communicable with each other via the network. Examples of the network include the Internet, a local area network (LAN), and a wide area network (WAN). The engineer-side device 10 and the expert-side device 20 may be connected to an input device, an output device, an imaging device, or other external devices via the network.

In FIG. 1, the engineer-side device 10 is a smartphone, but is not limited to tablet terminals. The expert-side device 20 is a general computer terminal, but may be a tablet terminal such as a smartphone, and is not limited to the general computer terminal. For example, a display is provided as an output device that displays a video or image.

The display serving as the output device may be a touch panel or the like to exert a function of an input device as well. The output device and the input device need not be mounted on each of the engineer-side device 10 and the expert-side device 20, and may be connected as external devices. In place of the display, virtual reality (VR) glasses or the like may be used to output display screens.

As illustrated in FIG. 1, a sensor 30 is connected to the expert-side device 20. The sensor 30 is a motion sensor that captures a real hand of a person to recognize positions and shapes of joints and fingers, thereby recognizing finger motions with high accuracy. The sensor 30 acquires information on a hand motion by sensing an actual hand motion of the expert. Examples of the sensor 30 include Leap Motion Controller (registered trademark) provided by Ultraleap. The Leap Motion Controller is an optical hand tracking module that captures a hand motion of a person with high accuracy. The Leap Motion Controller recognizes positions of fingers and joints to sense motions of the individual fingers with precision. Any motion sensor may be used as the sensor 30 as long as the sensor may sense user's finger motions, and is not limited to the Leap Motion Controller.

Figure 2:
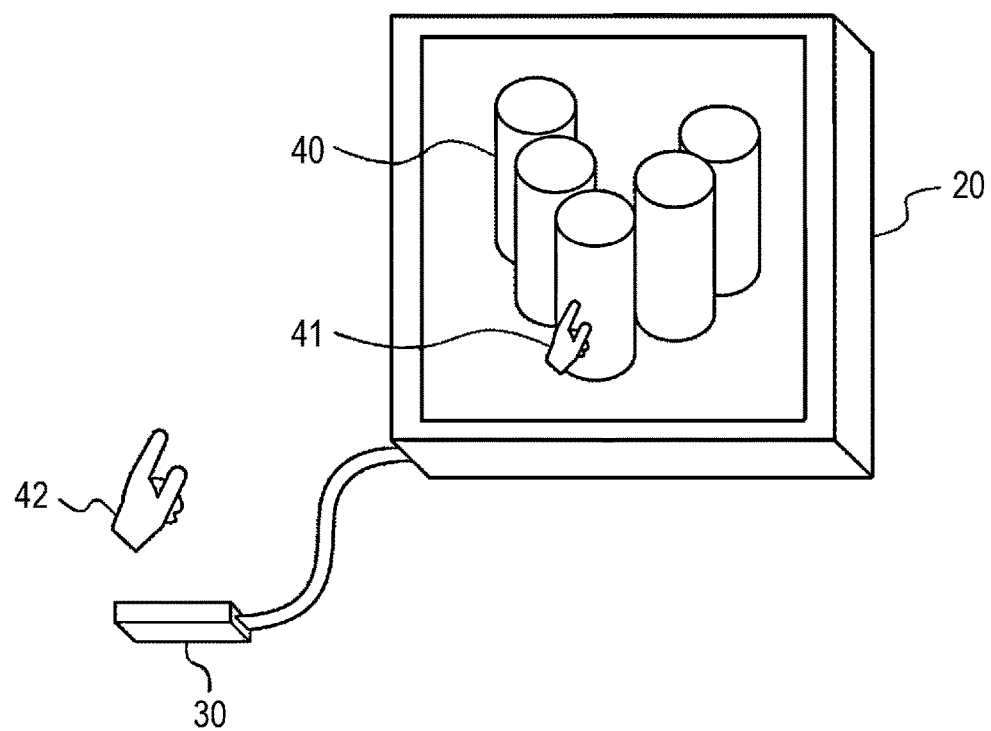
FIG. 2 illustrates an example of display contents output to an expert-side device.

FIG. 2 illustrates an example of display contents output to the expert-side device 20. The expert-side device 20 displays a video of an instruction target 40 that is transmitted from the engineer-side device 10. The video of the target 40 is hereinafter referred to as "target video". The expert gives an instruction to the remote engineer about the target 40 by displaying the received target video on the expert-side device 20 and operating a fingertip object 41 laid over the target video by using the sensor 30.

As illustrated in FIG. 2, the expert uses the sensor 30 connected to the expert-side device 20 to sense an actual hand motion of the expert. In FIG. 2, a hand 42 is a real hand of the expert, and an object 41 indicating a hand on the expert-side device 20 is the fingertip object 41 displayed on a screen.

The fingertip object 41 is displayed on the screen to reflect an actual hand motion of the expert. The fingertip object 41 is not limited to a pictured hand object illustrated in FIG. 2, and may be an arrow object or an image of the real hand of the expert.

In FIG. 2, the target 40 is represented by, for example, an object shaped as five columns connected together. In a case of displaying the target video and giving an oral instruction, the instruction is complicated because the expert needs to say, "the third column from the left", "the column nearest to you", or "the third column from the right". Even if the expert says, "in the middle of the column", the actual target portion of the target 40 is not easy to find, thereby causing a possibility of miscommunication.

In the information processing apparatus 1 according to this exemplary embodiment, the representation of the fingertip object 41 is changed based on information input by the expert depending on an item pointed by the fingertip object 41, thereby distinguishing the fingertip object 41 before and after the information input. For example, the fingertip object 41 may point the target 40, point a direction in the display screen, or may be displayed merely on the display screen. Therefore, there is a possibility of miscommunication if the fingertip object 41 does not clearly point an item. The information processing apparatus 1 according to this exemplary embodiment presents the fingertip object 41 while distinguishing its format depending on the item pointed by the fingertip object 41.

Figure 3:
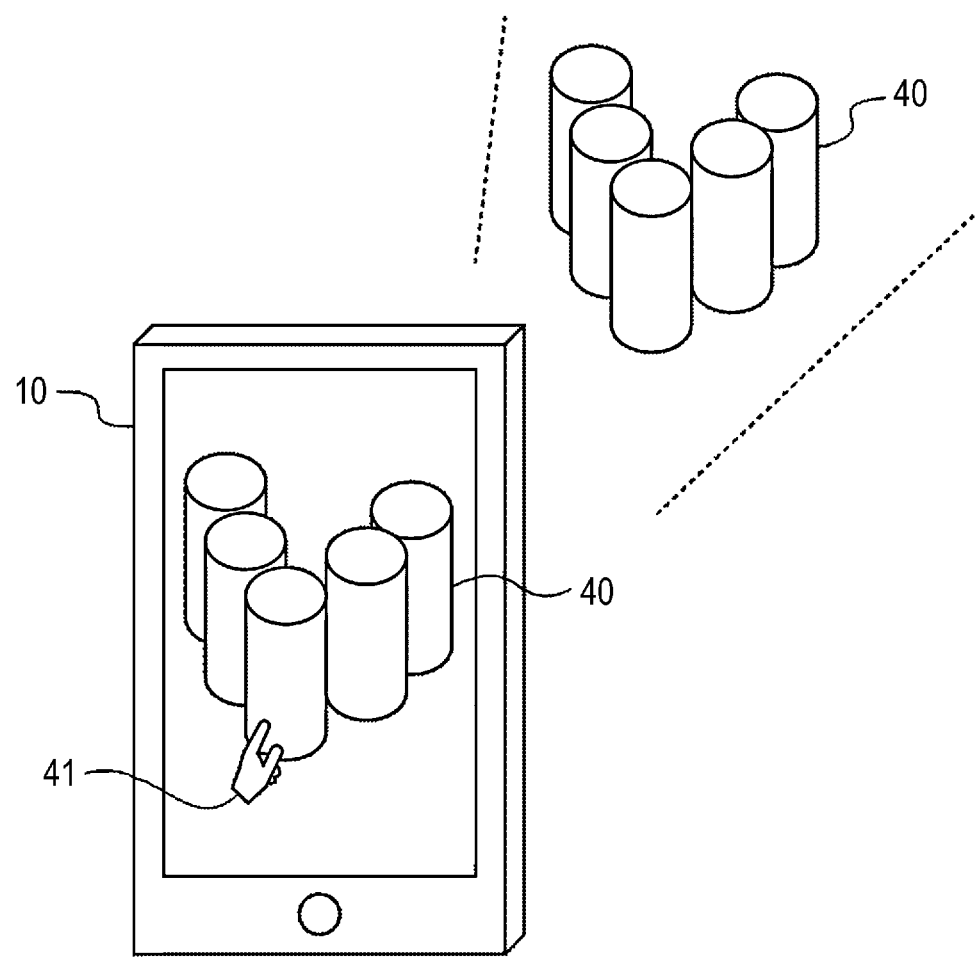
FIG. 3 illustrates an example of display contents output to an engineer-side device.

FIG. 3 illustrates an example of contents displayed on the engineer-side device 10. The engineer-side device 10 shoots the target 40 for which an expert's instruction is needed, and transmits the obtained target video to the expert-side device 20. The basic operation of the expert-side device 20 that has received the target video is described above with reference to FIG. 2. As illustrated in FIG. 3, the fingertip object 41 is laid over the target video in the engineer-side device 10 that has received the expert's hand motion acquired by the expert-side device 20. The engineer-side device 10 presents the fingertip object 41 in a format in which the fingertip object 41 clearly points the item.

Figure 4:
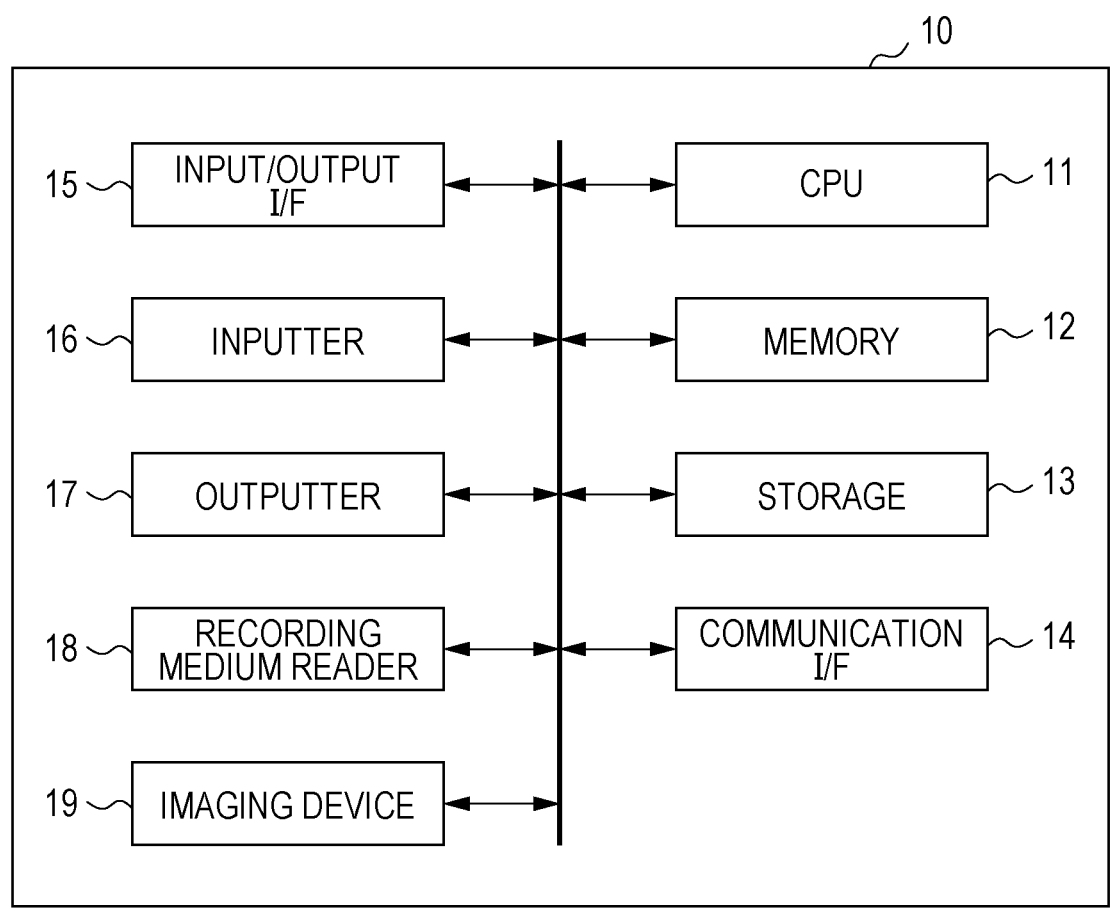
FIG. 4 is a block diagram illustrating the hardware configuration of the engineer-side device.

Next, the hardware configuration of the engineer-side device 10 according to this exemplary embodiment is described. FIG. 4 is a block diagram illustrating the hardware configuration of the engineer-side device 10 according to this exemplary embodiment.

As illustrated in FIG. 4, the engineer-side device 10 includes a central processing unit (CPU) 11, a memory 12, a storage 13, a communication interface (I/F) 14, an input/output I/F 15, an inputter 16, an outputter 17, a recording medium reader 18, and an imaging device 19.

The CPU 11 executes various programs and controls individual components. That is, the CPU 11 reads the programs from the storage 13, and executes the programs by using the memory 12 as a working area. The CPU 11 controls the individual components and executes various types of arithmetic processing based on the programs stored in the storage 13.

The memory 12 is a random access memory (RAM), and temporarily stores programs and data as the working area. The storage 13 is a read only memory (ROM), a hard disk drive (HDD), or a Solid State Drive (SSD), and stores various types of data and various programs including an operating system.

The communication I/F 14 is an interface for communication with other devices. For example, Ethernet (registered trademark), FDDI, Wi-Fi (registered trademark), or any other standard is used.

The input/output I/F 15 connects the engineer-side device 10 and external devices. In this exemplary embodiment, the engineer-side device 10 is connected to an external input device or the like via the input/output I/F 15.

The inputter 16 is typified by a keyboard and a mouse to be used for inputting various types of information. The inputter 16 may input information by voice. In a case where an external imaging device is connected, the inputter 16 inputs videos and images obtained by using the imaging device.

The outputter 17 is typified by a display that outputs the target video, the fingertip object 41, and the like. The outputter 17 may also output sound or voice as well as videos. In this case, the outputter 17 includes a loudspeaker.

The recording medium reader 18 reads data from or writes data into various storage media such as a compact disc (CD)-ROM, a digital versatile disc (DVD)-ROM, a Blu-ray disc, and a universal serial bus (USB) memory.

The imaging device 19 shoots a video or captures an image of the target 40 by using an imaging function of a camera mounted on the device.

Figure 5:
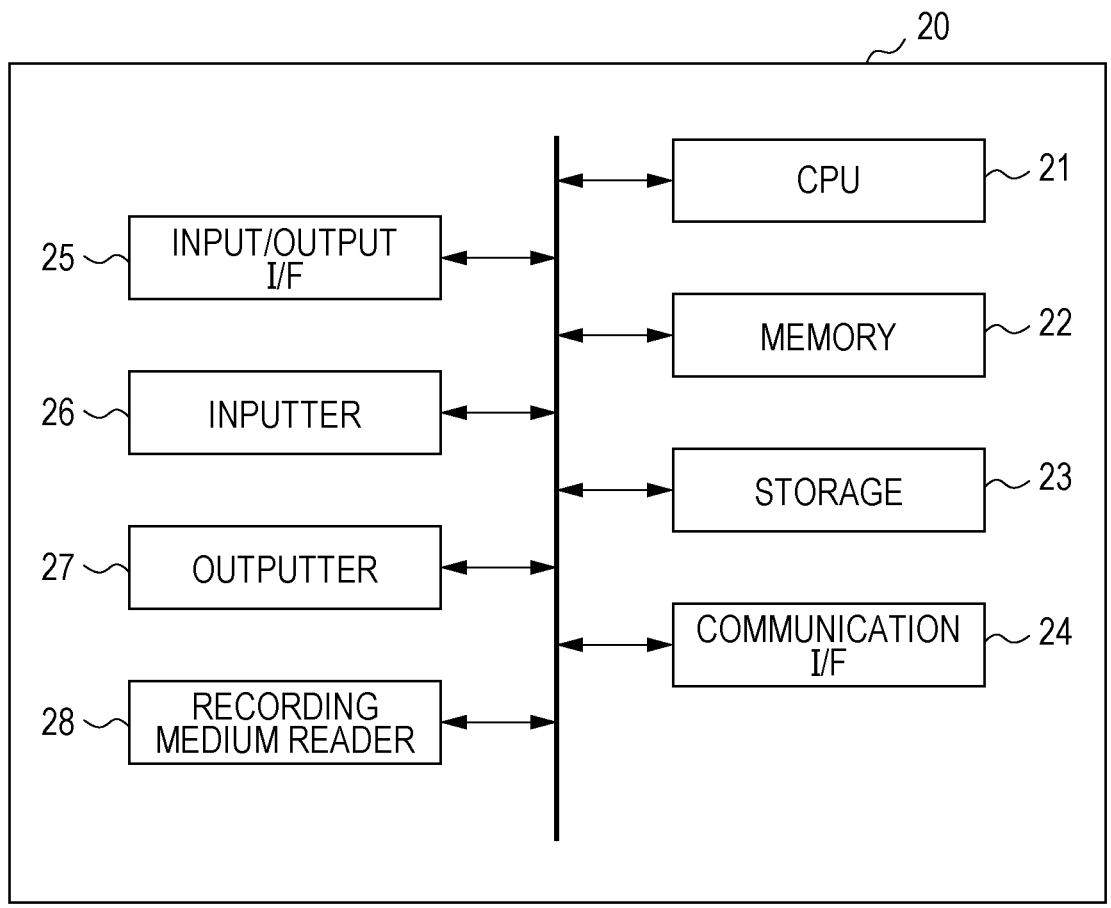
FIG. 5 is a block diagram illustrating the hardware configuration of the expert-side device.

FIG. 5 is a block diagram illustrating the hardware configuration of the expert-side device 20 according to this exemplary embodiment. As illustrated in FIG. 5, the hardware configuration of the expert-side device 20 overlaps the hardware configuration of the engineer-side device 10, and description thereof is omitted.

Figure 6:
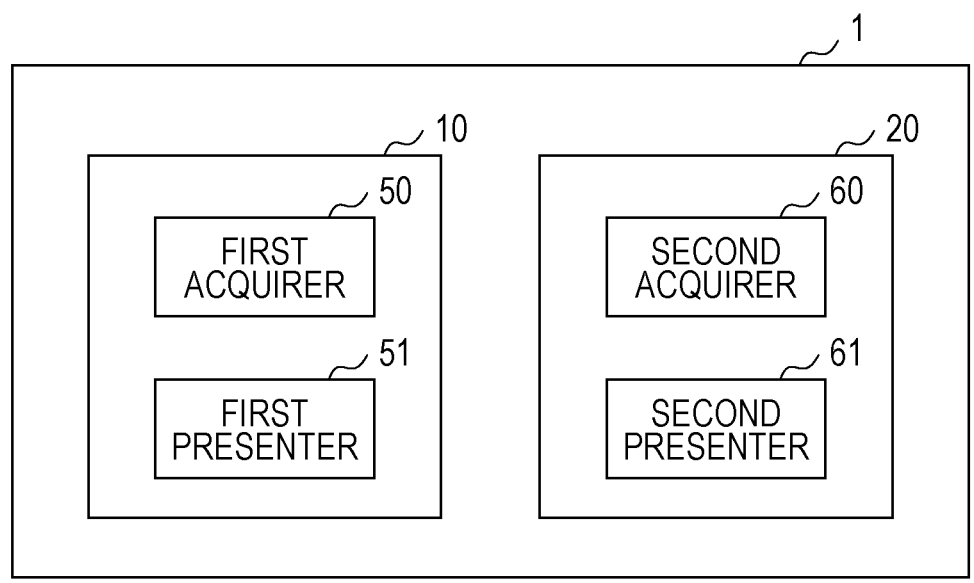
FIG. 6 is a block diagram illustrating the functional configurations of the engineer-side device and the expert-side device.

Next, the functional configuration of the information processing apparatus 1 according to this exemplary embodiment is described. FIG. 6 is a block diagram illustrating the functional configuration of the information processing apparatus 1.

As described above, the information processing apparatus 1 according to this exemplary embodiment is mounted on each of the engineer-side device 10 and the expert-side device 20. The mounted information processing apparatuses 1 exert functions between the devices to exchange and present various types of information.

As illustrated in FIG. 6, the information processing apparatus 1 includes a first acquirer 50 and a first presenter 51 in the engineer-side device 10 and a second acquirer 60 and a second presenter 61 in the expert-side device 20 as functional components. The functional components are implemented such that the CPU 11 of the engineer-side device 10 and a CPU 21 of the expert-side device 20 cooperate with the respective hardware components.

The first acquirer 50 acquires a target video showing the target 40 of the instruction.

The instruction is information to be exchanged when the expert gives an instruction to the remote engineer about a specific target 40. In a call center that receives inquiries about household appliances such as an air conditioner or a refrigerator and other products such as a multifunction peripheral having a copying function, the instruction includes information on an inquiry sent from a user (engineer) to the call center (expert) about repair or malfunction of a certain product (target 40). The instruction also includes information sent from the call center (expert) to the remote user (engineer) about what to do for the repair or malfunction of the product (target 40).

Figure 7:
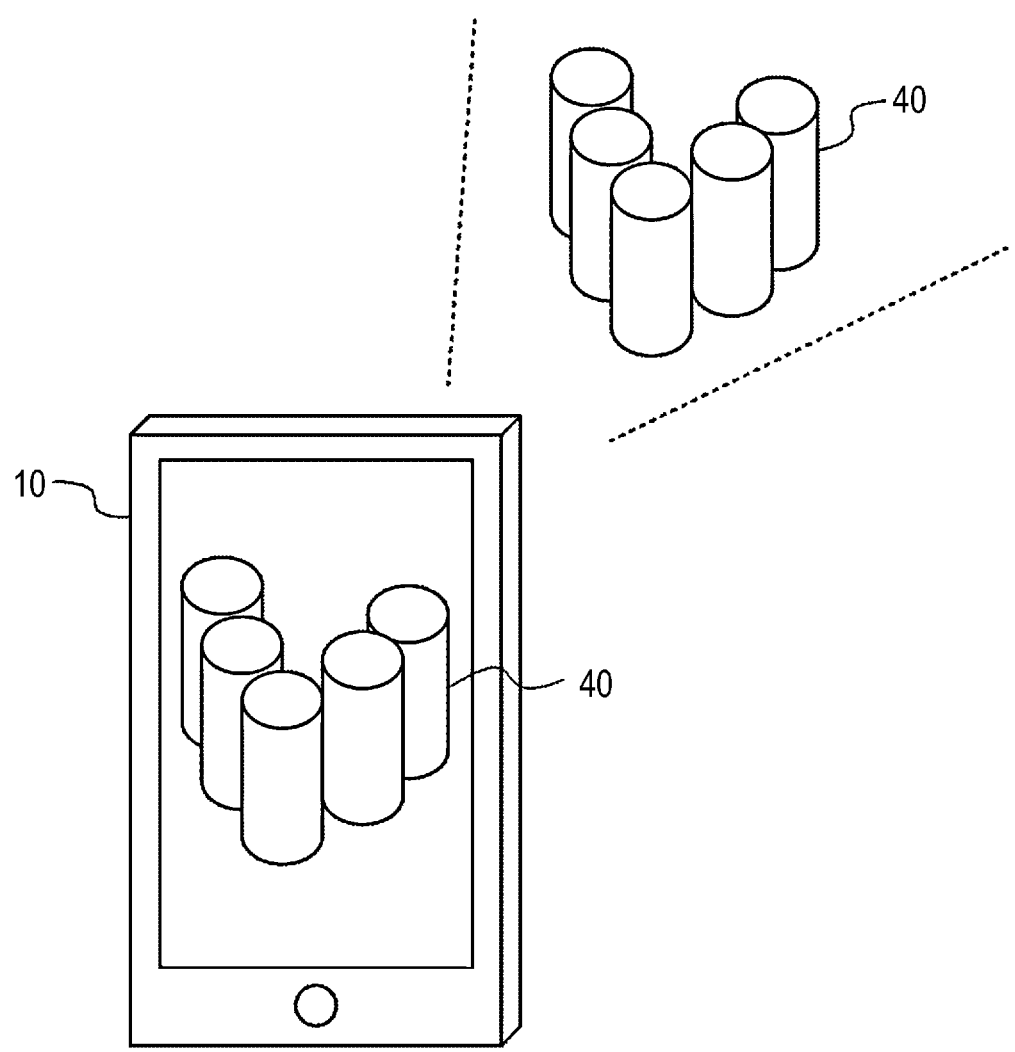
FIG. 7 illustrates an example of a target video.

FIG. 7 illustrates an example of the target video. In FIG. 7, a smartphone is used as an example of the engineer-side device 10, and a camera (imaging device 19) mounted on the engineer-side device 10 images the target 40 by using its imaging function. The target video may include a still or moving image showing the target 40.

The target 40 is an item for which an instruction is given. In FIG. 2 and FIG. 3, the target 40 is the object shaped as five columns connected together, but is not limited to a real object, and may be a two-dimensional object displayed on a display screen. The target 40 may be any item that may be imaged and visually recognized as a video or image.

The second acquirer 60 acquires the target video acquired by the engineer-side device 10. The second presenter 61 displays the acquired target video on an output device such as a display of the expert-side device 20. The expert views the specific target 40 for which an instruction is needed by the remote engineer.

The second acquirer 60 acquires fingertip information indicating an expert's hand motion.

The expert's hand motion is a motion of the fingertip object 41 displayed on the target video so that the expert shows what is intended by the instruction more clearly. The fingertip information indicates the expert's hand motion on the target 40 that is sensed by the sensor 30.

Figure 8:
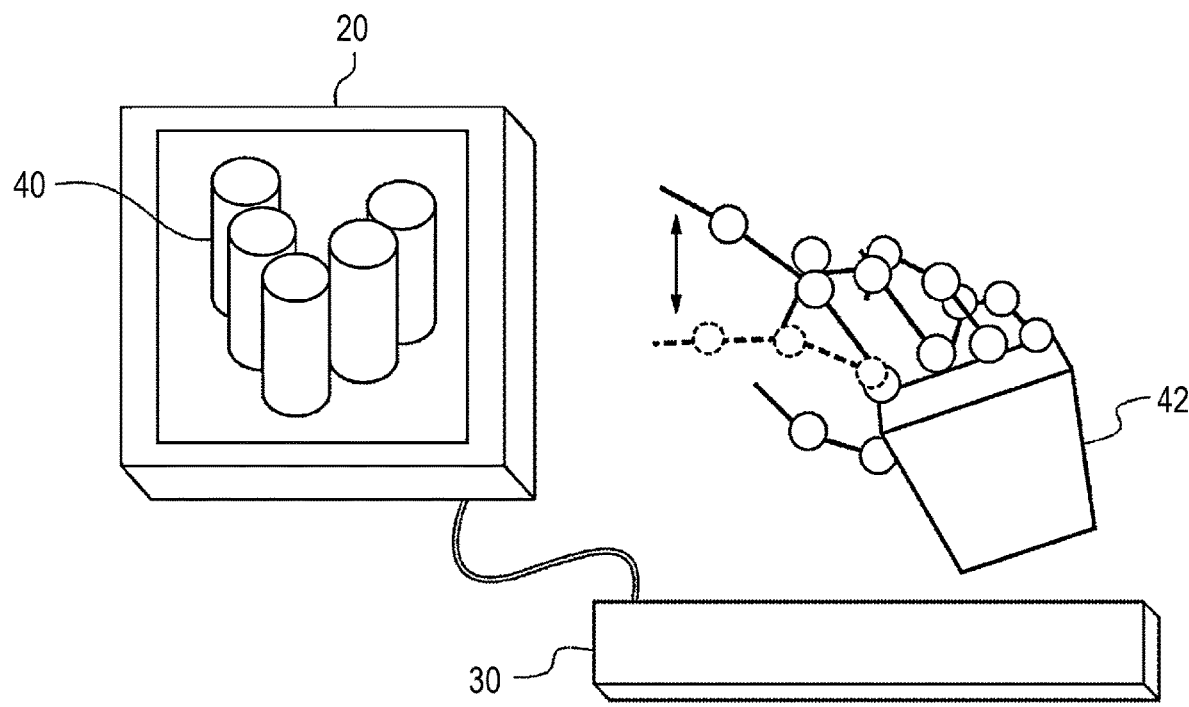
FIG. 8 illustrates an example of acquisition of a hand motion as fingertip information.

FIG. 8 illustrates an example of acquisition of the expert's hand motion as the fingertip information. As illustrated in FIG. 8, the sensor 30 focuses on a position of the tip of an index finger of the real hand 42 of the expert to sense, for example, a tap of the index finger. The tap of the index finger is sensed by detecting whether the tip of the index finger has vertically moved by an amount equal to or larger than a certain threshold within a predetermined period compared with the other fingers of the real hand 42 of the expert.

The first acquirer 50 acquires the fingertip information. The first presenter 51 overlays the target video with the fingertip object 41 indicated by the fingertip information. FIG. 2 illustrates a display example in which the target video is overlaid with the fingertip object 41 in the engineer-side device 10.

The second acquirer 60 acquires input information included in the fingertip information or separately input by the expert. The first acquirer 50 also acquires the input information included in the fingertip information or separately input by the expert. The first presenter 51 presents the fingertip object 41 while changing its representation based on the acquired input information.

The input information separately input by the expert is not limited to the fingertip information acquired by using the sensor 30, and may be information input by using a keyboard, a button, a mouse, or voice. For example, the information is input by inputting a predetermined text on the keyboard, pressing a predetermined button, performing a contact action such as a tap or touch on a touch panel, or uttering a predetermined phrase such as "target" or "direction in screen". The expert causes the fingertip information to include or separately inputs information for clearly showing whether the fingertip object 41 points the target 40, a direction in the display screen, or an object other than the target 40.

The first acquirer 50 acquires the input information included in the fingertip information or separately input by the expert. The first presenter 51 presents the fingertip object 41 on the engineer-side device 10 while distinguishing the representation of the fingertip object 41 based on the input information.

The first presenter 51 presents the fingertip object 41 on the engineer-side device 10 while distinguishing its format depending on the item pointed by the fingertip object 41 to clarify the item based on the input information included in the fingertip information or separately input by the expert. Examples of the format of the fingertip object 41 to be distinguished depending on whether the fingertip object 41 points the target 40, a direction in the display screen, or an object other than the target 40 include a predetermined color of the fingertip object 41, an index line extending from the fingertip object 41 to the item under instruction, and a sound to be output when the fingertip object 41 points a specific item. Details are described later.

The first presenter 51 presents the fingertip object 41 in a predetermined format if the fingertip object 41 points the target 40 based on the input information included in the fingertip information or separately input by the expert. Examples of the predetermined format of the fingertip object 41 include a predetermined color of the fingertip object 41.

The first acquirer 50 acquires the expert's hand motion as the input information. The first presenter 51 presents the fingertip object 41 while distinguishing its representation depending on the type of the acquired expert's hand motion.

Examples of the type of the expert's hand motion acquired as the input information include a predetermined hand motion sensed by the sensor 30 when the expert wants to present the fingertip object 41 pointing the target 40. Examples of the type of the predetermined hand motion include a tap and a finger turn as described later.

As the type of the predetermined expert's hand motion to be acquired as the input information, the first acquirer 50 acquires a vertical motion of the expert's fingertip.

The vertical motion of the expert's fingertip is a so-called tap. For example, it is determined in advance that the fingertip object 41 points the target 40 when the sensor 30 senses two strokes of vertical motion of the expert's fingertip. In this case, the first acquirer 50 acquires the two strokes of vertical motion of the expert's fingertip as the input information. The number of strokes of the vertical finger motion may be set by the expert or engineer as appropriate.

The number of strokes is not limited to the case of pointing the target 40, and may also be set as appropriate for the case of pointing a direction in the display screen. For example, the fingertip object 41 points the target 40 when the sensor 30 senses two strokes of vertical motion of the expert's fingertip, and the fingertip object 41 points a direction in the display screen when the sensor 30 senses three strokes of vertical motion of the expert's fingertip.

As the type of the predetermined expert's hand motion to be acquired as the input information, the first acquirer 50 acquires a turn of the expert's fingertip.

The turn of the expert's fingertip is an action of drawing a circle with the fingertip. Examples of the turn of the fingertip include a right turn of the fingertip and a left turn of the fingertip. For example, it is determined in advance that the fingertip object 41 points the target 40 when the sensor 30 senses the right turn of the expert's fingertip. In this case, the first acquirer 50 acquires the right turn of the expert's fingertip as the input information. The direction of the turn of the fingertip may be set by the expert or engineer as appropriate.

The direction of the turn is not limited to the case of pointing the target 40, and may also be set as appropriate for the case of pointing a direction in the display screen. For example, the fingertip object 41 points the target 40 when the sensor 30 senses a right turn of the expert's fingertip, and the fingertip object 41 points a direction in the display screen when the sensor 30 senses a left turn of the expert's fingertip.

The first acquirer 50 acquires an expert's hand motion using a predetermined finger as the input information.

For example, it is determined in advance that the fingertip object 41 points the target 40 when the sensor 30 senses a motion using the index finger of the expert as the expert's hand motion using the predetermined finger. In this case, the first acquirer 50 acquires a motion of the tip of the index finger of the expert as the input information. The tip of the finger to be used may be set by the expert or engineer as appropriate.

The use of the finger is not limited to the case of pointing the target 40, and may also be set as appropriate for the case of pointing a direction in the display screen. For example, the fingertip object 41 points the target 40 when the sensor 30 senses a motion using the index finger, and the fingertip object 41 points a direction in the display screen when the sensor 30 senses a motion using a little finger.

The first presenter 51 presents the fingertip object 41 in the predetermined format if the fingertip object 41 points the target 40 based on the number of strokes of vertical motion of the expert's fingertip.

As described later, examples of the predetermined format of the fingertip object 41 to be presented by the first presenter 51 include a predetermined color of the fingertip object 41, an index line extending from the fingertip object 41 to the item under instruction, and a sound to be output when the fingertip object 41 points a specific item.

The first presenter 51 distinguishes the representation format of the fingertip of the fingertip object 41 laid over the target video based on the input information acquired by the first acquirer 50.

Examples of the representation format of the fingertip of the fingertip object 41 include a small ripple effect to be presented at the fingertip of the fingertip object 41 when the fingertip object 41 points a predetermined item.

Figure 9:
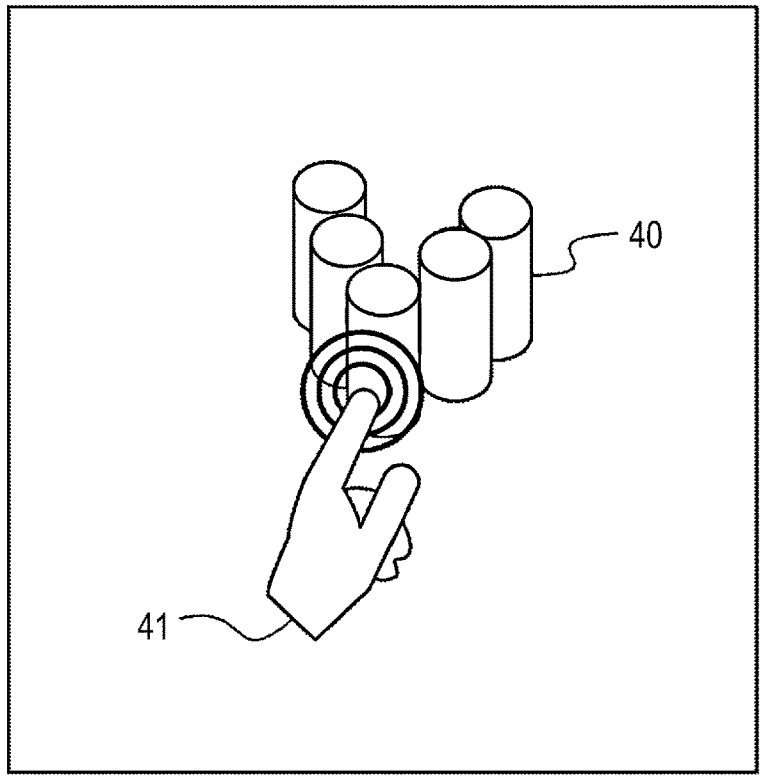
FIG. 9 illustrates an example of a ripple effect.

FIG. 9 illustrates an example of the ripple effect to be displayed at the fingertip of the fingertip object 41. FIG. 9 illustrates a display screen showing the fingertip object 41 laid over the target video. In the display screen of FIG. 9, the ripple effect is presented at the fingertip of the fingertip object 41 pointing the target 40. The ripple effect is not limited to the case where the fingertip object 41 points the target 40, and may also be presented, for example, in a case where the fingertip object 41 points a direction in the display screen. When to present the ripple effect may be set by the expert as appropriate.

If the fingertip object 41 points the target 40, the first presenter 51 presents an index line extending to the target 40 from the fingertip of the fingertip object 41 laid over the target video.

Figure 10:
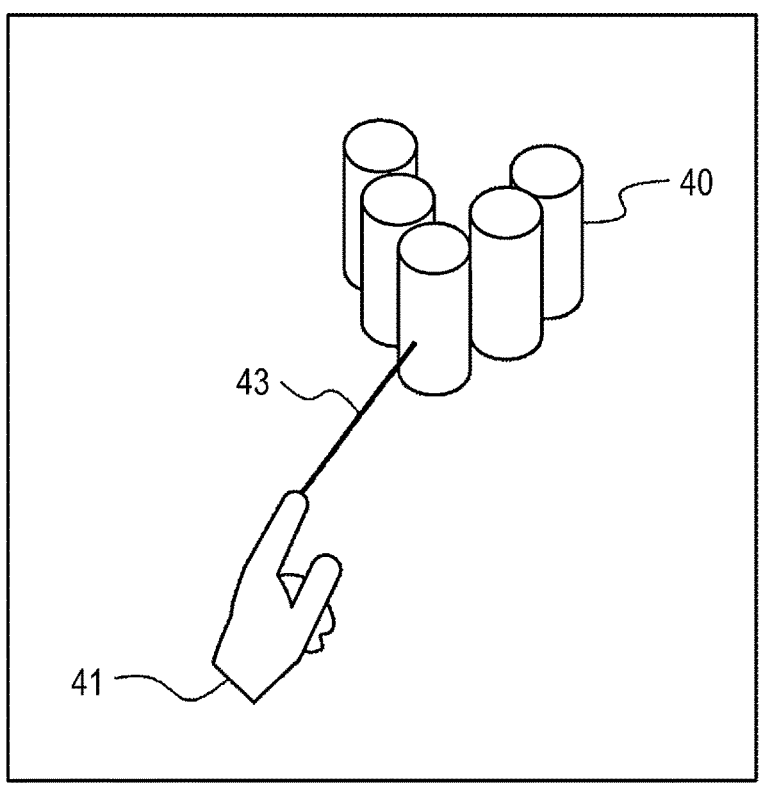
FIG. 10 illustrates an example of an index line.

FIG. 10 illustrates an example of an index line 43 extending from the fingertip of the fingertip object 41 to the target 40. FIG. 10 illustrates a display screen showing the fingertip object 41 laid over the target video. In FIG. 10, the display screen shows the fingertip object 41 with the index line 43 extending from the fingertip to the target 40. The index line 43 is not limited to the case where the fingertip object 41 points the target 40, and may also be presented, for example, in a case where the fingertip object 41 points a direction in the display screen. When to present the index line 43 may be set by the expert as appropriate.

The first presenter 51 changes the presentation format of the index line 43 based on the input information. The change in the shape, thickness, or color of the index line 43 and in the shape of the tip of the index line 43 may be set by the expert or engineer as appropriate. Examples of the change in the shape of the tip of the index line 43 include a change in the shape of the tip of the index line 43 to an arrow shape or a circular shape. The first presenter 51 may change and distinguish the format of the index line 43 not only in the case where the fingertip object 41 points the target 40. The first presenter 51 may change and distinguish the format of the index line 43 depending on the item pointed by the fingertip object 41.

The length of the index line 43 may be changed by the expert as appropriate. For example, the index line 43 extending from the fingertip of the fingertip object 41 to the target 40 may be presented and the length of the index line 43 may be changed in response to a scroll of the mouse by the expert. In a case where a depth camera or a depth sensor is mounted on the engineer-side device 10, the first presenter 51 may automatically adjust the length of the index line 43 while detecting a distance (depth) to the target 40.

The first presenter 51 distinguishes the fingertip object 41 based on its color if the fingertip object 41 points the target 40. If the fingertip object 41 points the target 40 based on the input information acquired by the first acquirer 50, the fingertip object 41 is distinguished by changing its color from a default color. For example, the color of the fingertip object 41 is set to red if the fingertip object 41 points the target 40.

The color of the fingertip object 41 is not limited to the case where the fingertip object 41 points the target 40. The fingertip object 41 may also be distinguished by changing its color, for example, in a case where the fingertip object 41 points a direction in the display screen. When to distinguish the fingertip object 41 by changing its color may be set by the expert as appropriate. For example, the color of the fingertip object 41 is set to red when the fingertip object 41 points the target 40, and the color of the fingertip object 41 is set to blue when the fingertip object 41 points a direction in the display screen.

The first presenter 51 distinguishes the fingertip object 41 based on a sound if the fingertip object 41 points the target 40. If the fingertip object 41 points the target 40 based on the input information acquired by the first acquirer 50, the fingertip object 41 is presented while being distinguished from a default presentation format of the fingertip object 41 by outputting a sound such as "pop", "blip", or "beep".

As another example of sounds, voice may be output like "The target is pointed now." The sound of the fingertip object 41 is not limited to the case where the fingertip object 41 points the target 40, and may also be output, for example, in a case where the fingertip object 41 points a direction in the display screen. When to output the sound together with the fingertip object 41 may be set by the expert as appropriate.

The second acquirer 60 acquires an expert's instruction or detects an elapse of a predetermined period, and transmits the expert's instruction or the elapse of the predetermined period to the engineer-side device 10. The first acquirer 50 acquires the expert's instruction acquired by the second acquirer 60 or the elapse of the predetermined period detected by the second acquirer 60. The first presenter 51 presents the fingertip object 41 while resetting the change in the presentation format.

The expert's instruction is given to reset the change in the presentation format of the fingertip object 41. The expert's instruction may be information input similarly to the input information, that is, input by using a predetermined hand motion, the keyboard, a button, a sound, or voice. The predetermined hand motion includes movement of the expert's hand to a specific area. Examples of the specific area include an area outside a detection range of the expert-side device 20. When the expert's hand is moved out of the detection range of the expert-side device 20 and is then detected again, the fingertip object 41 is displayed in the default format before the change. In a case where a touch is detected on the touch panel to change the presentation format of the fingertip object 41, the fingertip object 41 is displayed in the default format when the touch is no longer detected. In a case where the change in the format is reset based on the predetermined period, the predetermined period may be set by the expert as appropriate. For example, the predetermined period is set to one minute after the fingertip object 41 is presented while being distinguished in the changed format.

The reset of the change in the presentation format of the fingertip object 41 is a reset to the default format of the fingertip object 41 before the distinction by the change. The first presenter 51 resets the ripple effect, the index line 43, or the changed color of the fingertip object 41 to the default format of the fingertip object 41 before the change without the index line 43 or the like.

Figure 11:
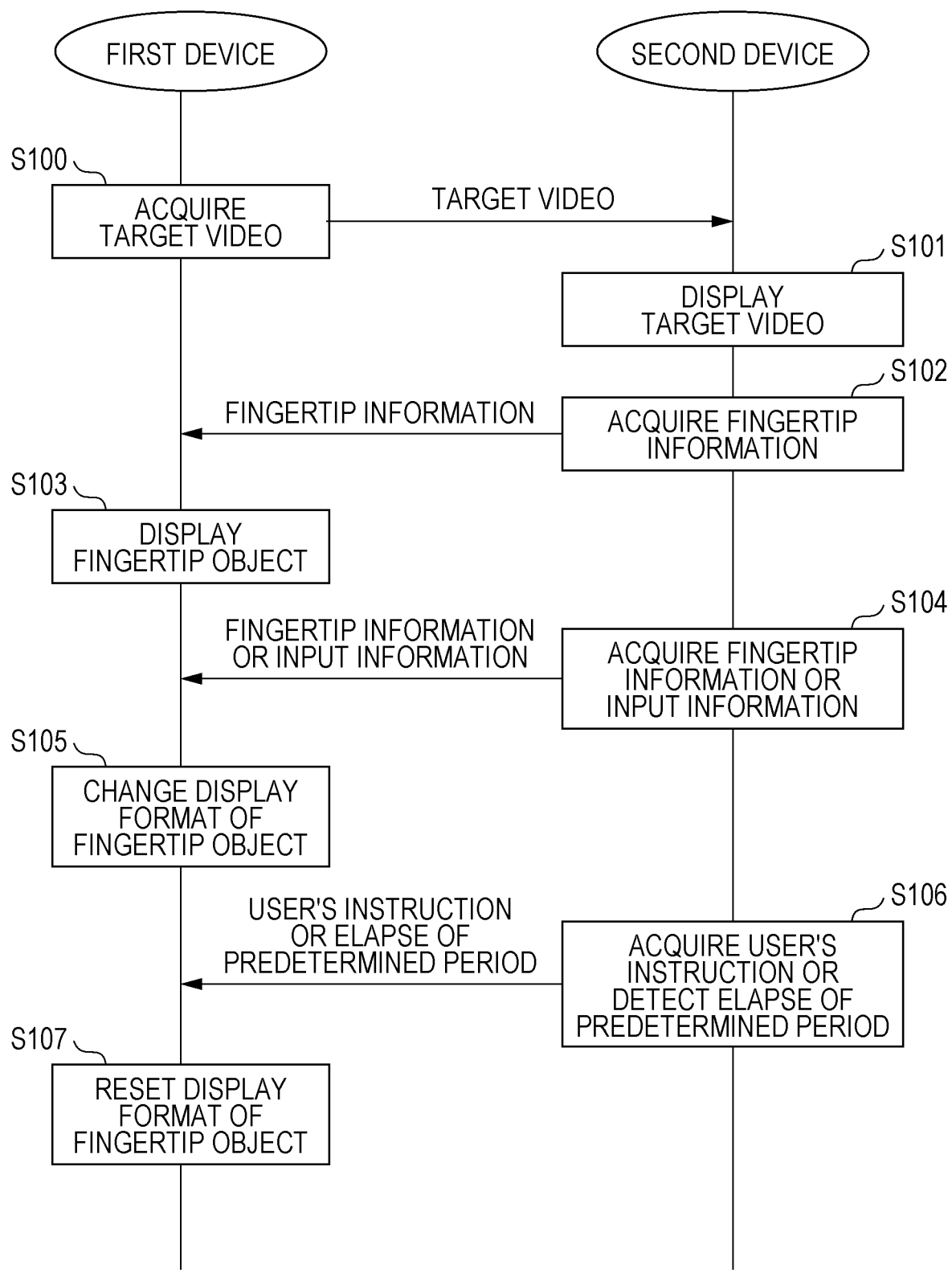
FIG. 11 is a sequence diagram illustrating a relationship between a first device and a second device.

Next, mutual operations between a first device and a second device are described under the assumption that the first device is the engineer-side device 10 including the information processing apparatus 1 according to this exemplary embodiment and the second device is the expert-side device 20 including the information processing apparatus 1. FIG. 11 is a sequence diagram illustrating processes to be performed by the information processing apparatus 1 according to this exemplary embodiment. The processes are performed such that the CPU 11 and the CPU 21 read and execute information processing programs stored in, for example, the storage 13 and a storage 23, respectively.

In Step S100, the CPU 11 serving as the first acquirer 50 acquires a target video and transmits the target video to the second device.

In Step S101, the CPU 21 serving as the second presenter 61 displays the target video on the screen.

In Step S102, the CPU 21 serving as the second acquirer 60 acquires fingertip information and transmits the fingertip information to the first device.

In Step S103, the CPU 11 serving as the first presenter 51 overlays the target video with the fingertip object 41.

In Step S104, the CPU 21 serving as the second acquirer 60 acquires fingertip information or input information and transmits the fingertip information or the input information to the first device.

In Step S105, the CPU 11 serving as the first presenter 51 changes the display format of the fingertip object 41 laid over the target video.

In Step S106, the CPU 21 serving as the second acquirer 60 acquires a user's instruction or detects an elapse of the predetermined period, and transmits the user's instruction or the elapse of the predetermined period to the first device.

In Step S107, the CPU 11 serving as the first presenter 51 resets the display format of the fingertip object 41 laid over the target video.

The users in the information processing apparatus 1 according to this exemplary embodiment include the expert and the engineer.

In this exemplary embodiment, the sensor 30 is connected only to the expert-side device 20, but may be connected to the engineer-side device 10 as well as the expert-side device 20.

In this exemplary embodiment, the index line 43 extending from the fingertip of the fingertip object 41 to the target 40 is presented based on the input information, but may be presented constantly and, when the input information is acquired, the format of the index line 43 may be changed based on the input information.

In this exemplary embodiment, the item pointed by the fingertip object 41 is distinguished based on a sound or voice, but may be distinguished by using a vibration function of the device in place of the sound or voice.

In this exemplary embodiment, the input information separately input by the expert is not limited to the fingertip information acquired by using the sensor 30, and also includes the information input by using the keyboard, the button, or voice. The action is not limited to those exemplified above. Other examples include movement of the fingertip object 41 out of the display screen, and sensing of opening of all the fingers of the real hand of the expert with the sensor 30.

In this exemplary embodiment, the information processing program is, but not limited thereto, installed in each of the storage 13 and the storage 23. The information processing program according to this exemplary embodiment may be provided by being recorded in a computer readable storage medium. For example, the information processing program according to this exemplary embodiment may be provided by being recorded in an optical disc such as a compact disc (CD)-ROM or a digital versatile disc (DVD)-ROM, or in a semiconductor memory such as a universal serial bus (USB) memory or a memory card. The information processing program according to this exemplary embodiment may be acquired from an external device via a communication network connected to each of the communication I/F 14 and a communication I/F 24.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
acquire a target video showing a target of an instruction as the target is captured by a camera of the information processing apparatus, and transmit the target video to a remote device;
acquire, from the remote device, fingertip information indicating a hand motion made by a user of the remote device while the remote device displays the target video;
overlay the target video with a fingertip object indicated by the fingertip information; and
present the fingertip object while changing a representation of the fingertip object based on input information included in the fingertip information or input by the user,
wherein the processor is configured to present the fingertip object while resetting a change in a presentation format of the fingertip object based on an instruction from the user or an elapse of a predetermined period.

2. The information processing apparatus according to claim 1, wherein the processor is configured to present the fingertip object in a predetermined format if the fingertip object points the target based on the input information.

3. The information processing apparatus according to claim 2,
wherein the input information indicates the hand motion of the user, and
wherein the processor is configured to present the fingertip object while distinguishing the representation of the fingertip object depending on a type of the hand motion of the user.

4. The information processing apparatus according to claim 3,
wherein the type of the hand motion of the user is a vertical motion of a fingertip of the user, and
wherein the processor is configured to present the fingertip object in the predetermined format if the fingertip object points the target based on the number of strokes of the vertical motion of the fingertip of the user.

5. The information processing apparatus according to claim 3,
wherein the type of the hand motion of the user is a turn of a fingertip of the user, and
wherein the processor is configured to present the fingertip object in the predetermined format if the fingertip object points the target based on a direction of the turn of the fingertip of the user.

6. The information processing apparatus according to claim 1,
wherein the input information indicates the hand motion of the user, and
wherein the processor is configured to present the fingertip object while distinguishing the representation of the fingertip object depending on a type of the hand motion of the user.

7. The information processing apparatus according to claim 6,
wherein the type of the hand motion of the user is a vertical motion of a fingertip of the user, and
wherein the processor is configured to present the fingertip object in a predetermined format if the fingertip object points the target based on the number of strokes of the vertical motion of the fingertip of the user.

8. The information processing apparatus according to claim 6,
wherein the type of the hand motion of the user is a turn of a fingertip of the user, and
wherein the processor is configured to present the fingertip object in a predetermined format if the fingertip object points the target based on a direction of the turn of the fingertip of the user.

9. The information processing apparatus according to claim 6,
wherein the type of the hand motion of the user is a touch on an outputter that displays the target video, and
wherein the processor is configured to present the fingertip object in a predetermined format in response to the touch on the outputter.

10. The information processing apparatus according to claim 9, wherein the processor is configured to present the fingertip object while resetting a change in the format of the fingertip object at an end of the touch on the outputter.

11. The information processing apparatus according to claim 6,
wherein a hand motion of the user using a predetermined finger points the target, and
wherein the processor is configured to present the fingertip object in a predetermined format if the fingertip object points the target.

12. The information processing apparatus according to claim 6, wherein the processor is configured to distinguish a representation format of a fingertip of the fingertip object laid over the target video based on the acquired input information.

13. The information processing apparatus according to claim 12, wherein the processor is configured to, if the fingertip object points the target, present an index line extending to the target from the fingertip of the fingertip object laid over the target video.

14. The information processing apparatus according to claim 13, wherein the processor is configured to change a presentation format of the index line based on the input information.

15. The information processing apparatus according to claim 6, wherein the processor is configured to distinguish the fingertip object based on a color of the fingertip object if the fingertip object points the target.

16. The information processing apparatus according to claim 6, wherein the processor is configured to distinguish the fingertip object based on a sound if the fingertip object points the target.

17. The information processing apparatus according to claim 1,
wherein the instruction from the user indicates movement of a hand of the user to a specific area, and
wherein the processor is configured to reset the change in the presentation format of the fingertip object in response to detection of the movement of the hand of the user to the specific area.

18. A non-transitory computer readable medium storing a program causing a computer to execute a process for processing information, the process comprising:
acquiring a target video showing a target of an instruction as the target is captured by a camera of the information processing apparatus, and transmit the target video to a remote device;
acquiring, from the remote device, fingertip information indicating a hand motion made by a user of the remote device while the remote device displays the target video;
overlaying the target video with a fingertip object indicated by the fingertip information; and
presenting the fingertip object while changing a representation of the fingertip object based on input information included in the fingertip information or input by the user,
wherein the process comprises presenting the fingertip object while resetting a change in a presentation format of the fingertip object based on an instruction from the user or an elapse of a predetermined period.

19. An information processing system comprising a first device and a second device,
wherein the first device comprises a first processor, and the second device comprises a second processor,
wherein the first processor is configured to acquire a target video showing a target of an instruction as the target is captured by a camera of the first device, cause a display to display the target video, and transmit the target video to the second device that is remotely located from the first device,
wherein the second processor is configured to acquire fingertip information indicating a hand motion made by a user of the second device while the second device displays the target video, and transmit the fingertip information to the first device so that the display of the first device overlays the target video with a fingertip object indicated by the fingertip information,
wherein the first processor is configured to cause the display to present the fingertip object while changing a representation of the fingertip object based on input information included in the fingertip information or input by the user, and
wherein the first processor is configured to present the fingertip object while resetting a change in a presentation format of the fingertip object based on an instruction from the user or an elapse of a predetermined period.

* * * * *